(12) United States Patent
Rutman et al.

(10) Patent No.: US 12,258,075 B2
(45) Date of Patent: Mar. 25, 2025

(54) ADJUSTABLE BASE PLATE

(71) Applicant: Ford Global Technologies, LLC, Dearborn, MI (US)

(72) Inventors: Matthew B. Rutman, Canton, MI (US); Eric Scott Levine, Novi, MI (US); Michael M. Azzouz, Farmington, MI (US); Stuart C. Salter, White Lake, MI (US); Jeffrey R. Sturges, Grosse Pointe Farms, MI (US); William Wurz, San Francisco, CA (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/886,663

(22) Filed: Aug. 12, 2022

(65) Prior Publication Data

US 2024/0051619 A1 Feb. 15, 2024

(51) Int. Cl.
| | |
|---|---|
| *B62D 33/08* | (2006.01) |
| *B60P 1/02* | (2006.01) |
| *B60P 7/08* | (2006.01) |
| *B60R 5/04* | (2006.01) |

(52) U.S. Cl.
CPC .............. *B62D 33/08* (2013.01); *B60P 1/025* (2013.01); *B60P 7/0815* (2013.01); *B60R 5/04* (2013.01)

(58) Field of Classification Search
CPC ....... B62D 33/02; B62D 33/08; B60P 7/0815; B60P 1/025; B60P 1/16427; B60R 5/04
See application file for complete search history.

(56) References Cited

U.S. PATENT DOCUMENTS

| | | | |
|---|---|---|---|
| 5,513,941 A | 5/1996 | Kulas et al. | |
| 5,938,262 A | 8/1999 | Mills | |
| 6,503,036 B1 | 1/2003 | Bequette et al. | |
| 7,121,603 B2 * | 10/2006 | Stevenson | B60P 1/003 |
| | | | 296/37.6 |
| 7,416,234 B2 | 8/2008 | Bequette | |
| 7,681,936 B2 | 3/2010 | McClintock et al. | |
| 10,583,962 B2 | 3/2020 | Brunner et al. | |
| 10,632,824 B2 * | 4/2020 | Jung | B60J 7/047 |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |

(Continued)

OTHER PUBLICATIONS

US 10,947,009 B2, 03/2021, Brunner et al. (withdrawn)

*Primary Examiner* — Gregory A Blankenship
(74) *Attorney, Agent, or Firm* — Vichit Chea; Carlson, Gaskey & Olds, P.C.

(57) ABSTRACT

An adjustable base plate system includes a first track structure configured to extend along one side of a vehicle cargo area and a second track structure configured to extend along an opposite side of a vehicle cargo area. At least one base plate has a first edge and a second edge opposite of the first edge, wherein the first edge is supported by the first track structure and the second edge is supported by the second track structure. The first track structure and the second track structure each comprise at least a first tier track and a second tier track such that a distance between a bottom surface of the at least one base plate and a support surface of the vehicle cargo area can be adjusted.

25 Claims, 4 Drawing Sheets

(56) References Cited

U.S. PATENT DOCUMENTS

| | | |
|---|---|---|
| D896,518 S | 9/2020 | Brunner et al. |
| D897,103 S | 9/2020 | Brunner et al. |
| D898,320 S | 10/2020 | Brunner et al. |
| 10,889,168 B2 * | 1/2021 | Jung .................... B60J 7/1607 |
| 10,919,428 B2 * | 2/2021 | Wallace .................. B60R 5/041 |
| 10,962,218 B2 | 3/2021 | Plato et al. |
| 10,981,696 B2 | 4/2021 | Brunner et al. |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| 11,027,883 B1 | 6/2021 | Brunner et al. |
| D920,671 S | 7/2021 | Brunner et al. |
| D923,935 S | 7/2021 | Brunner et al. |
| 11,084,362 B2 * | 8/2021 | Jung ...................... B60J 7/041 |
| 11,192,690 B1 | 12/2021 | Brunner et al. |
| 11,268,691 B2 | 3/2022 | Plato et al. |
| 11,365,026 B2 | 6/2022 | Brunner et al. |
| 11,427,382 B2 | 8/2022 | Brunner et al. |
| 11,465,805 B2 | 10/2022 | Brunner et al. |
| 11,904,951 B2 * | 2/2024 | Harmon ............. B62D 33/0273 |
| 2003/0170090 A1 | 9/2003 | Douglas et al. |
| 2006/0016840 A1 * | 1/2006 | Svenson .................... B60R 5/04 224/543 |
| 2008/0260486 A1 * | 10/2008 | Bequette ................... B60R 5/04 410/94 |
| 2009/0167045 A1 * | 7/2009 | Storgato .................... B60R 5/04 296/65.01 |
| 2010/0308617 A1 * | 12/2010 | Golden .................... B60J 7/041 296/39.2 |
| 2015/0054299 A1 * | 2/2015 | Yoshizawa .............. B60R 5/045 296/37.16 |
| 2018/0154836 A1 * | 6/2018 | Herman .................. B60R 5/044 |
| 2019/0106063 A1 | 4/2019 | Briggs et al. |
| 2022/0009562 A1 | 1/2022 | Mannone |
| 2023/0145943 A1 * | 5/2023 | Allen ...................... B60P 1/286 298/12 |
| 2023/0399061 A1 * | 12/2023 | Palumbo ................ B60J 7/0576 |
| 2024/0051470 A1 * | 2/2024 | Salter ........................ B60R 9/06 |
| 2024/0051619 A1 * | 2/2024 | Rutman ............. B62D 33/0273 |
| 2024/0132164 A1 * | 4/2024 | Dylewski, II .......... B62D 33/02 |

\* cited by examiner

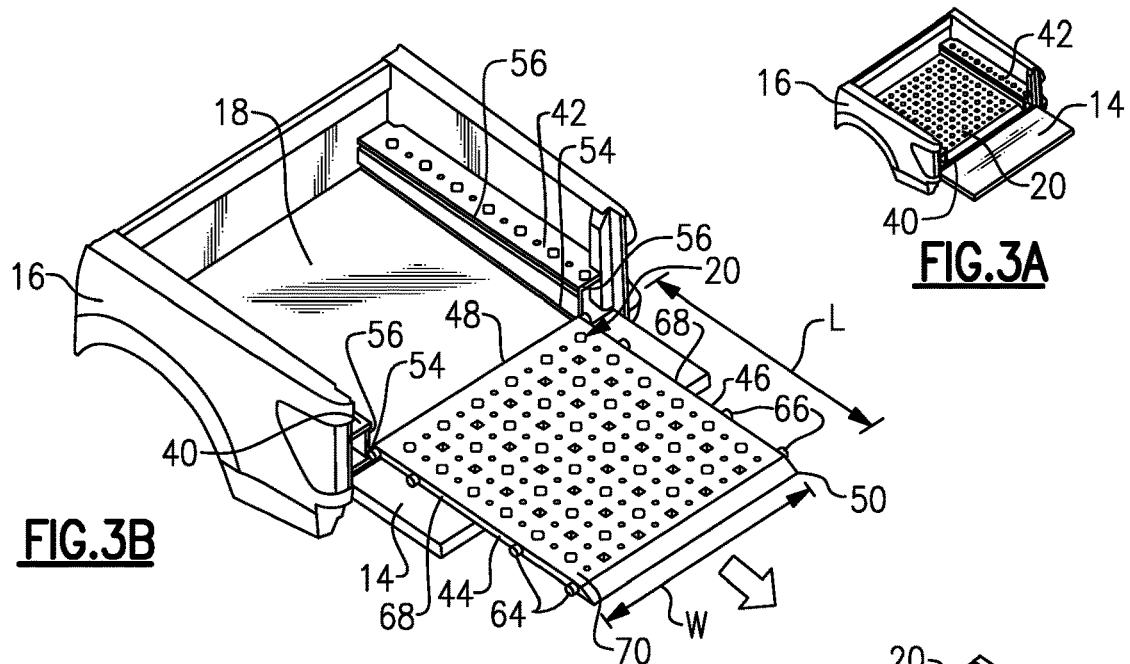
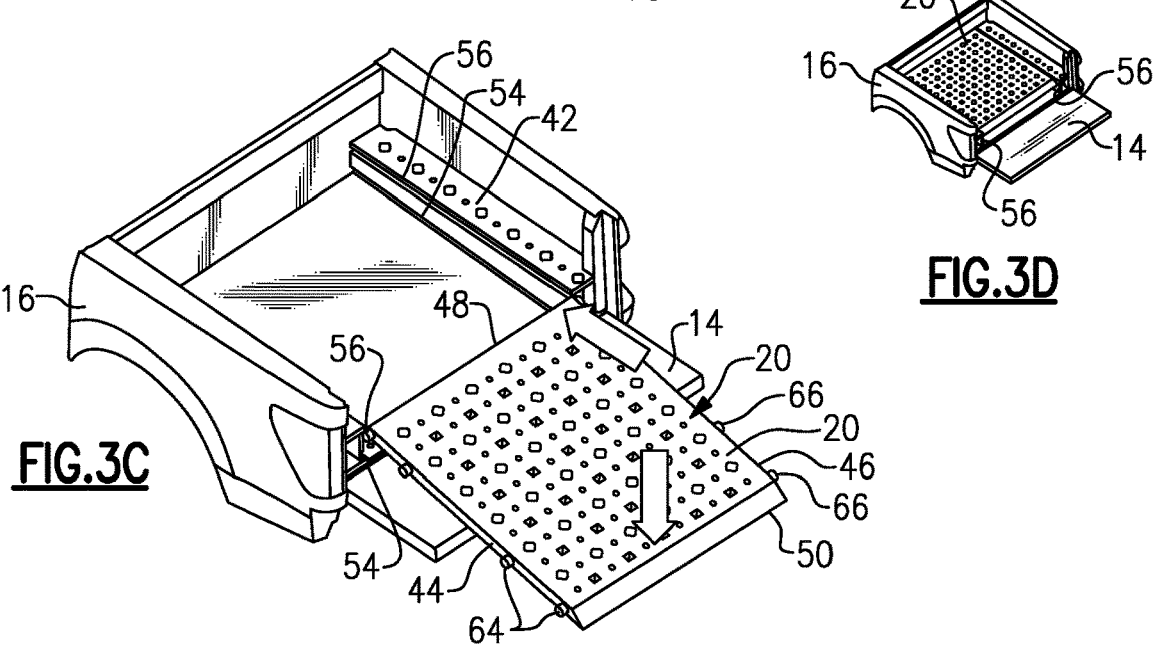
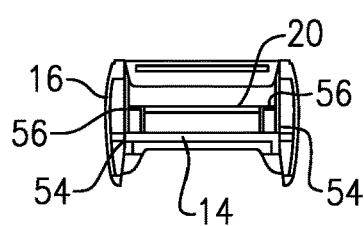
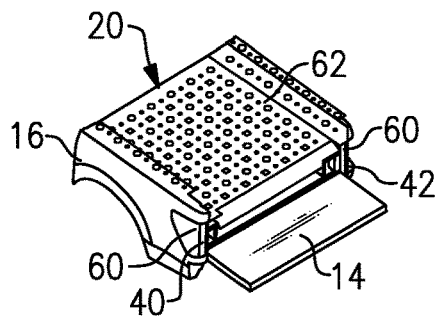

ADJUSTABLE BASE PLATE

TECHNICAL FIELD

This disclosure relates generally to a base plate and, more particularly, to an adjustable base plate system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Additionally, materials such as lumber, drywall, mulch, etc. need to be transported to various locations.

SUMMARY

In some aspects, the techniques described herein relate to an adjustable base plate system, including: a first track structure configured to extend along one side of a vehicle cargo area; a second track structure configured to extend along an opposite side of a vehicle cargo area; at least one base plate having a first edge and a second edge opposite of the first edge, wherein the first edge is supported by the first track structure and the second edge is supported by the second track structure; and wherein the first track structure and the second track structure each comprise at least a first tier track and a second tier track such that a distance between a bottom surface of the at least one base plate and a support surface of the vehicle cargo area can be adjusted.

In some aspects, the techniques described herein relate to an adjustable base system, wherein the second tier tracks are spaced apart from respective first tier tracks in a vertical direction relative to the support surface of the vehicle cargo area.

In some aspects, the techniques described herein relate to an adjustable base system including at least an additional third tier track on each of the first track structure and the second track structure that is spaced apart from the first and second tier tracks in the vertical direction.

In some aspects, the techniques described herein relate to an adjustable base system, wherein, when the at least one base plate is installed on the third tier track, a cover is provided to enclose the vehicle cargo area.

In some aspects, the techniques described herein relate to an adjustable base system, wherein the second tier track is vertically higher than the first tier track such that when the at least one base plate is installed on the second tier track the vehicle cargo area is increased between the bottom surface of the at least one base plate and the support surface of the vehicle cargo area.

In some aspects, the techniques described herein relate to an adjustable base system, wherein the support surface of the vehicle cargo area is free from any base plate support structures between the first track structure and the second track structure.

In some aspects, the techniques described herein relate to an adjustable base system including a first set of rollers on the first edge of the at least one base plate and a second set of rollers on the second edge of the at least one base plate.

In some aspects, the techniques described herein relate to an adjustable base system, wherein the at least one base plate has a width extending in a lateral direction across a width of a vehicle and a length extending in a longitudinal direction along a length of the vehicle, and wherein roller of the first and second sets of rollers are respectively spaced apart from each other in the longitudinal direction along the first and second edges of the at least one base plate.

In some aspects, the techniques described herein relate to an adjustable base system, wherein rollers of the first and second sets of rollers extend outwardly of the first and second edges of the at least one base plate in the lateral direction.

In some aspects, the techniques described herein relate to an adjustable base system, wherein the first and second edges of the at least one base plate have edge surfaces that are perpendicular to a cargo support surface of the at least one base plate.

In some aspects, the techniques described herein relate to an adjustable base system, wherein the first and second sets of rollers are either positioned on the first tier track or the second tier track to install the at least one base plate in the vehicle cargo area.

In some aspects, the techniques described herein relate to an adjustable base system, wherein the at least one base plate is moved at least partially outwardly of the vehicle cargo area via the first and second sets of rollers along one of the first and second tier tracks to install the at least one base plate on the other of the first and second tier tracks.

In some aspects, the techniques described herein relate to an adjustable base system including a locking mechanism to lock the at least one base plate to at least one of the first track structure and the second track structure in one of a plurality of lock positions.

In some aspects, the techniques described herein relate to an adjustable base system, wherein the plurality of lock positions include at least a fully installed position where the at least one base plate does not extend beyond the vehicle cargo area and an extended position where the at least one base plate extends outwardly of the vehicle cargo area to provide an extended support surface.

In some aspects, the techniques described herein relate to an adjustable base system including a stop supported by a vehicle structure, wherein the stop prevents the at least one base plate from detaching from a vehicle while switching the at least one base plate between the first and second tier tracks.

In some aspects, the techniques described herein relate to an adjustable base system, wherein the vehicle cargo area comprises a pick-up truck bed, and wherein the vehicle structure that supports the stop comprises a tailgate.

In some aspects, the techniques described herein relate to a method, the method including: adjusting a position of at least one base plate within a vehicle cargo area by moving opposing edges of the at least one base plate along a track structure that includes at least an upper tier track and a lower tier track; and selectively changing a distance between a bottom surface of the at least one base plate and a support surface of the vehicle cargo area by switching the at least one base plate between the upper and lower tier tracks.

In some aspects, the techniques described herein relate to a method, the method including: providing a first set of rollers along one of the opposing edges of the at least one base plate and a second set of rollers along the other of the opposing edges; rolling the first and second sets of rollers along either the upper tier track or lower tier track to adjust a position of the at least one base plate within the vehicle cargo area; and selectively locking the at least one base plate to the track structure in one of a plurality of lock positions that include at least a fully installed position where the at least one base plate does not extend beyond the vehicle cargo area and an extended position where the at least one base plate extends outwardly of the vehicle cargo area to provide an extended support surface.

In some aspects, the techniques described herein relate to a method, the method including: moving the at least one base plate in a rearward direction along one of the upper tier track and lower tier track such that a rearward end of the at least one base plate extends outwardly of the vehicle cargo area; pivoting the rearward end of the at least one base plate to move a forward end of the at least one base plate to the other of the upper tier track and lower tier track; and moving the forward end of the at least one base plate in a forward direction to install the at least one base plate on the other of the upper tier track and lower tier track.

In some aspects, the techniques described herein relate to a method, the method including engaging a stop during pivoting to prevent the at least one base plate from disengaging from a vehicle that supports the at least one base plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3A is a perspective view of an adjustable base plate mounting system with the baseplate in a fully installed position on a lower tier of the track.

FIG. 3B is a view similar to FIG. 3A but with the baseplate in the a fully extended position.

FIG. 3C is a view similar to FIG. 3A but shows the baseplate pivoting from the lower tier of the track to an upper tier of the track.

FIG. 3D is a view similar to FIG. 3A but shows the base plate fully installed on the upper tier of the track.

FIG. 3E is an end view of FIG. 3D.

FIG. 3F is a perspective view with the track including an additional upper tier such that the base plate can be used as a cover for the cargo bed.

DETAILED DESCRIPTION

This disclosure details an adjustable mounting system for a base plate that is positioned within a vehicle cargo area. The system includes a base plate that provides an attachment interface for securing accessories to the vehicle. The system allows a height of the base plate within the vehicle cargo area to be selectively adjusted. Various types of accessories can be secured to the vehicle through the attachment interface provided by the base plate. The number and positions of base plates can be adjusted for particular vehicles or particular needs. The disclosure also provides for locking/unlocking features such that one or more base plates can be securely locked in place within the vehicle. This provides a user with a substantially modular and adjustable mounting and attachment system.

There are often situations where it would be useful for the vehicle owner to be able to switch between different upfit systems to enable different functional capabilities, or to temporarily remove a base plate or an upfit accessory to allow the module or its contents to be used off the vehicle, then reattach the base plate and/or module once the desired operation or task is completed. Traditional upfit integration of elements into a vehicle by mechanical, bolt-on physical attachment makes it difficult to easily change different types of base plates or accessories for use in different applications. The subject disclosure provides an adjustable base plate system that has a quick connect/disconnect capability to allow for adjustability of a location of the base plate within the vehicle cargo area.

Figure 1:
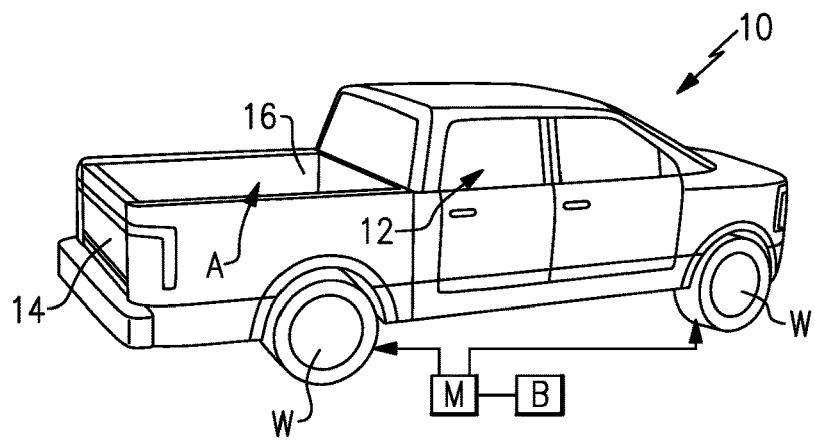
FIG. 1 illustrates a perspective view of a vehicle having a cargo bed that can be equipped with base plates used to secure accessories according to an exemplary aspect of the present disclosure.

FIGS. 1-7 disclose exemplary embodiments of the adjustable base plate system that interfaces with a track structure within a vehicle cargo area. With reference to FIGS. 1 and 2A-2B, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection.

The accessories 22 can engage one or more of the base plates 20 using an attachment system. In the exemplary embodiment, the attachment system includes a plurality of apertures 24 and at least one foot 26 that cooperate to provide a mechanical connection interface. The base plate 20 is supported on the vehicle surface 18 of the cargo area A with an additional support interface that is separate from the mechanical connection interface for the accessories 22. In one example, the additional support interface comprises a track assembly.

In one example, the base plates 20 provide the apertures 24 and the accessories 22 include a plurality of feet 26. This could be rearranged, however, such that one or all of the feet 26 extend from the base plates 20 and the accessories 22 provide some or all of the apertures 24.

Figure 2A:
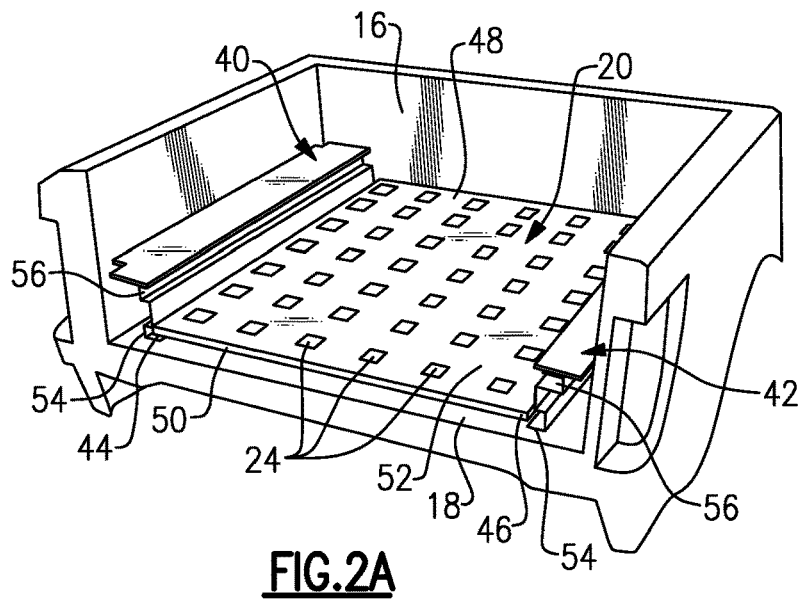
FIG. 2A is a perspective view of an adjustable base plate mounting system for a cargo bed, where the mounting system comprises a track.
Figure 2B:
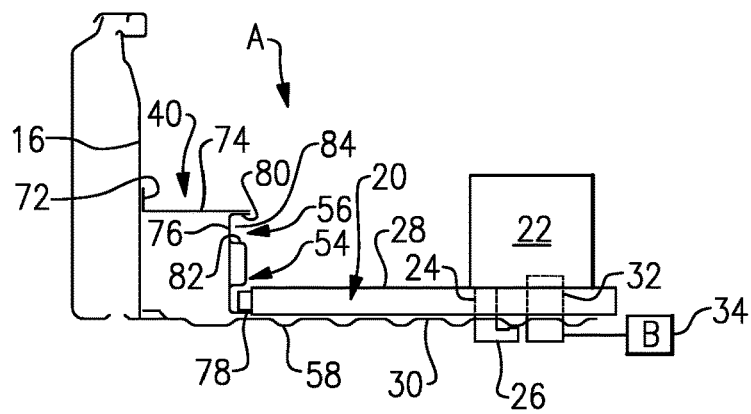
FIG. 2B is a section view of the adjustable base plate mounting system of FIG. 2A.

In the exemplary embodiment, when the base plate 20 and the accessories 22 are engaged, the feet 26 are each received within one of the apertures 24 such that the feet 26 each extend from a first side 28 of the base plate 20, through one of the apertures 24, and past an opposite, second side 30 of the base plate 20 as schematically shown in FIG. 2B.

In one example, the accessory 22 comprises a lockable box that is mechanically coupled to the vehicle 10 through the base plate 20. Optionally, the accessory 22 could additionally comprise a lockable box that includes a power interface 32. This would allow devices within the lockable box to be powered from a vehicle power supply 34 such as the battery pack B, for example. The internal device could be a refrigerated container that is powered by the vehicle 10 when the box is engaged with the base plate 20, or the devices within the lockable box could comprise rechargeable tools, which can be recharged when set within the box and coupled to a charging interface between the accessory 22 and the base plate 20. In one example, the base plate 20 can be plugged into either 12V vehicle power or other power sources via a variety of connections/outlets.

In the subject disclosure, a track assembly is used to mount one or more base plates 20 within a cargo area A. In one example, the track assembly comprises a first track structure 40 configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

As shown in FIG. 2A, the first 44 and second 46 edges are parallel to each other. The base plate 20 also has a third edge 48 and a fourth edge 50 that are parallel and spaced apart from each other. The third 48 and fourth 50 edges connect to the first 44 and second 46 edges such that the base plate 20 comprises a four-sided generally flat and planar mount surface 52 to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area can be adjusted.

In FIGS. 2A-B a two-tier track is shown; however, additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16. In the example shown in FIG. 3F, at least an additional third tier track 60 is provided on each of the first track structure 40 and the second track structure 42. The third tier track 60 is spaced apart from the first 54 and second 56 tier tracks in the vertical direction V. In one example, when the base plate 20 is installed on the third tier track 60, the base plate serves as a tonneau cover 62 that encloses the vehicle cargo area A.

By installing the base plate 20 on the second tier track 56, the base plate 20 is vertically higher than when the base plate 20 is supported by the first tier track 54. This increases the available cargo area between the bottom surface 58 of the base plate 20 and the support surface 18 of the cargo area A. Additionally, the support surface 18 is free from any base plate support structures between the first track structure 40 and the second track structure 42 as shown in FIG. 3E. This further increases available cargo area and also allows for the base plates to be completely removed from the vehicle such that the support surface 18 can receive large, tall items such as furniture, large boxes, etc.

In one example, the edges 44, 46 of the base plate 20 include low-friction members that allow the base plate 20 to be easily moved along the first 54 and second 56 tier tracks such that the base plate 20 can be switched between the two different height levels. In one example, a first set of sliders or rollers 64 are positioned on the first edge 44 of the base plate 20 and a second set of sliders or rollers 66 are positioned on the second edge 46 of the base plate 20.

In one example, the base plate 20 has a width W extending in a lateral direction across a width of the vehicle V and a length L extending in a longitudinal direction along a length of the vehicle 10. The first 44 and second 46 edges of the base plate 20 extend in the longitudinal direction and the third 48 and fourth 50 edges of the base plate 20 extend in the lateral direction. The first 44 and second 46 edges of the base plate 20 have edge surfaces 68 that are perpendicular to a cargo support surface 70 of the base plate 20. The first 64 and second 66 sets of rollers are respectively spaced apart from each other in the longitudinal direction along the first 44 and second 46 edges of the base plate 20. In one example, the first 64 and second 66 sets of rollers extend outwardly of the first 44 and second 46 edges of the base plate 20 in the lateral direction. In one example, the rollers comprise axles that are fixed to the base plate edges with roller elements supported on the axles to independently rotate about a respective axis of the axles.

In one example, the first track structure 40 and the second track structure 42 are steel, roll-formed structures that are mounted to sides of the cargo bed 16 and/or to outermost edge portions of the support surface 18. In one example, the first 40 and second 42 track structures have a cross-section that comprises a first flange 72 extending in the vertical direction, a first or upper plate 74 that extends from the first flange 72 to a second or side plate 76, and a second flange 78 that extends from the side plate 76 in a lateral direction. The first plate 74 extends in the lateral direction and the second plate 76 extends in a vertical direction. The first flange 72 is attached to a side surface of the cargo bed 16 and the second flange 78 is attached to the support surface 18. The first 54 and second 56 tier tracks are formed within the side plate 76. In one example, the first 54 and second 56 tier tracks comprise an upper surface 80, a lower surface 82, and a side surface 84 that extends between the upper 80 and lower 82 surfaces to form a C-shape or U-shape. The open cross-section of the C-shape or U-shape is open in a direction that faces the cargo area A. Thus, as FIGS. 2A-B show a two-tier track configuration, each of the first 40 and second 42 track structures include two C-shape portions, one for each tier. For additional tiers, the height of the side plate 76 would be increased such that additional C-shape portions could be formed in the side plate 76. As discussed above, the first 64 and second 66 sets of rollers are either positioned on the first tier track 54, the second tier track 56, or on an additional tier track to install the base plate 20 in the vehicle cargo area A.

FIG. 3A shows the base plate in a fully installed position on the lower tier track 54. To change the position of the base plate 20, the fourth edge 50, e.g. a rearward edge, of the base plate 20 is moved at least partially outwardly of the vehicle cargo area A via the first 64 and second 66 sets of rollers along the first tier track 54 as shown in FIG. 3B. The base plate 20 is then removed from the first tier track 54 and is installed on the second tier track 56. Optionally, the base plate 20 can be completely removed from the cargo area A as needed.

In one example, the base plate 20 is moved in a rearward direction along the lower tier track 54 such that a rearward end of the base plate 20 extends outwardly of the vehicle cargo area, and then the rearward end of the base plate 20 is pivoted downward to move a forward end 48 of the base plate 20 in an upward direction to the upper tier track 56 as shown in FIG. 3C. Finally, the forward end of the base plate 20 is then moved in a forward direction to install the base plate 20 on the upper tier track 56 as shown in FIGS. 3D-E. FIG. 3E shows how much the cargo area underneath the base plate 20 is increased by moving to the upper tier. FIG. 3F shows the base plate installed on an additional upper tier track 60 to provide the option of a cover 62.

Figure 4A:
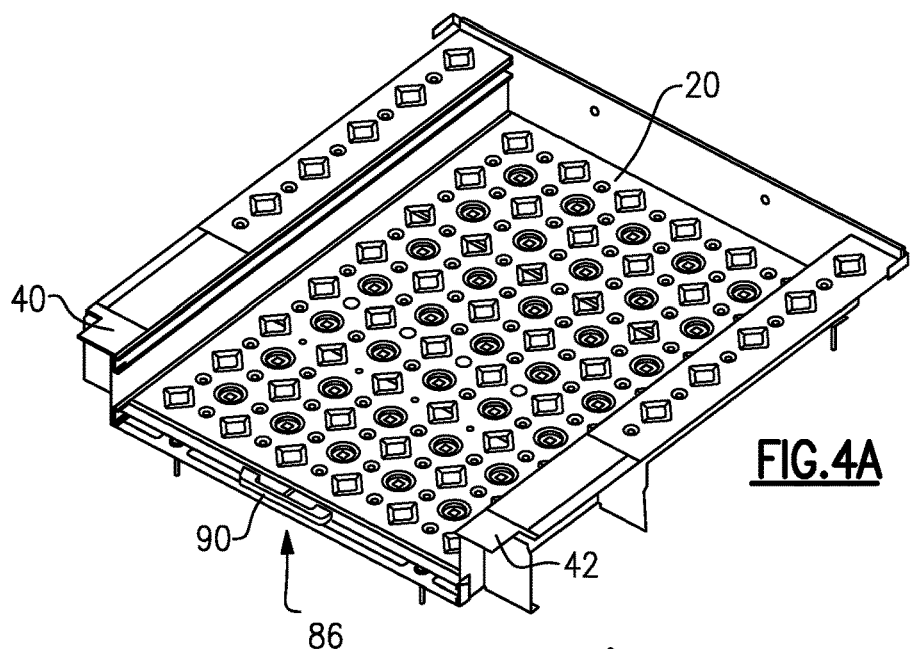
FIG. 4A is a perspective top view of a locking system for the adjustable base plate mounting system.
Figure 4B:
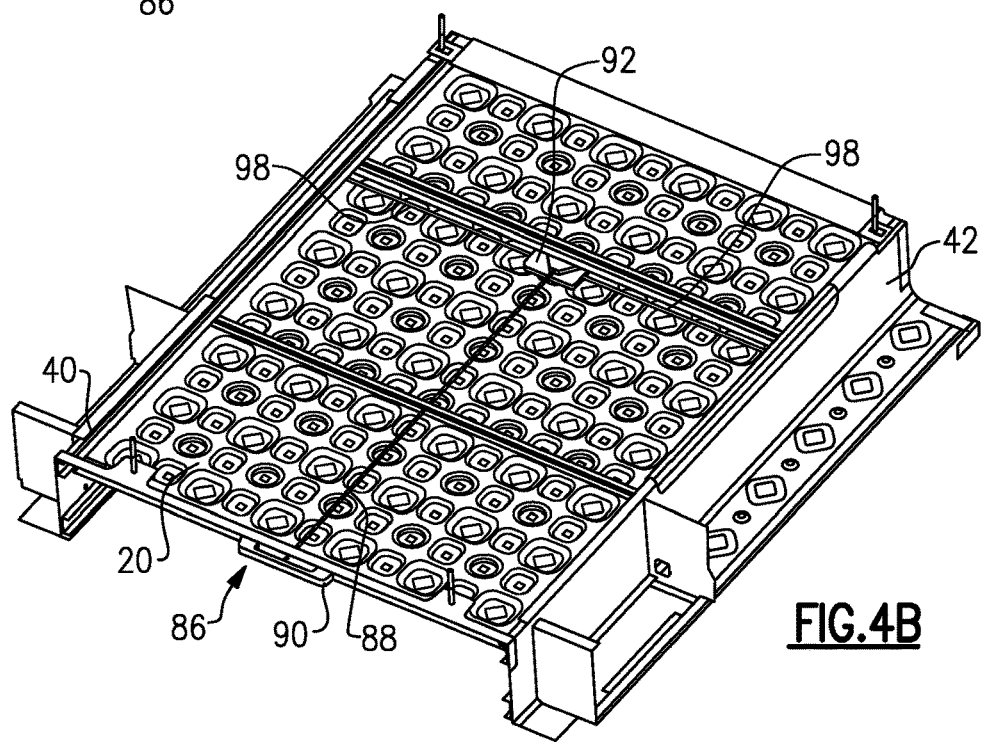
FIG. 4B is a perspective bottom view of the locking system of FIG. 4A.
Figure 4C:
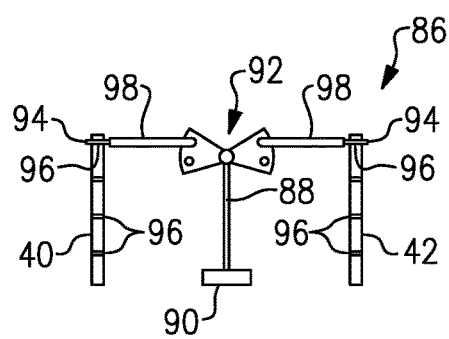
FIG. 4C shows a pivoting lever assembly of the locking system of FIG. 4B.
Figure 5:
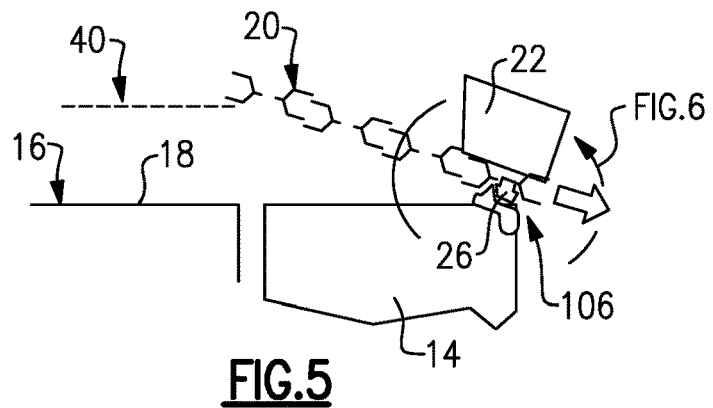
FIG. 5 is a schematic view of a stop used during height adjustment of the base plate.
Figure 6:
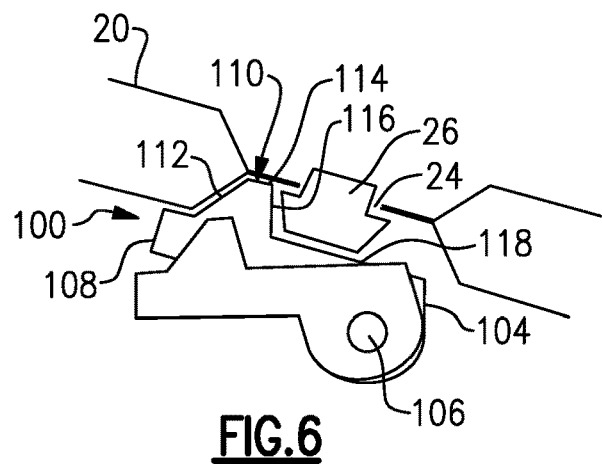
FIG. 6 is a magnified view of a detail shown in FIG. 5.
Figure 7:
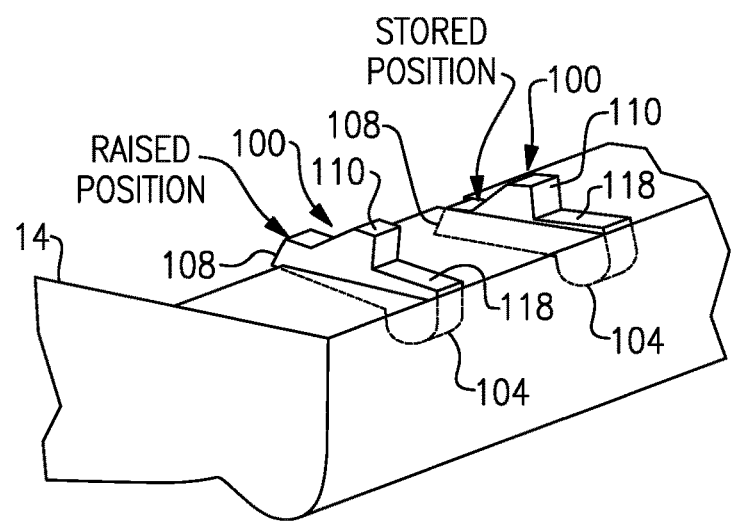
FIG. 7 is a schematic view showing the stop in a stowed position and in an active position.

In one example shown in FIGS. 4A-4C, a locking mechanism 86 is used to lock the base plate 20 to at least one of the first track structure 40 and the second track structure 42 in one of a plurality of lock positions. The plurality of lock positions include at least a fully installed position where the base plate 20 does not extend beyond the vehicle cargo area A and an extended position where the base plate 20 extends outwardly of the vehicle cargo area A to provide an extended support surface (FIG. 3B). The extended support surface allows users that are shorter in height to more easily access cargo or accessories 22 on the base plate 20. In one example, the locking mechanism 86 comprises a rod 88 that has one end coupled to a handle 90 and an opposite end coupled to a pivoting lever assembly 92. The pivoting lever assembly 92 is coupled to one or more pins 94 that are moved into and out of holes 96 in the first track structure 40 and the second truck structure 42. The pins 94 are attached to rods 98 that are coupled to the pivoting lever assembly 92. When the handle 90 is pulled in a rearward direction, the rod 88 pivots the lever assembly 92, which pulls the rods 98 inwardly to release the pins from the holes 96 such that the base plate 20 can be unlocked.

In one example, a stop 100 (FIG. 5) is supported by a vehicle structure, wherein the stop 100 prevents the base plate 20 from detaching from the vehicle 10 while switching the base plate 20 between the first 54 and second 56 tier tracks. In one example, the vehicle structure that supports the stop 100 comprises the tailgate 14. In one example, the stop 100 comprises a cleat that has a first end 104 that is coupled to the tailgate 14 via a pivot pin 106. A second end 108 of the cleat pivots from a stowed position to a raised, stop position when engaged by the rear edge of the base plate 20 during switching plate positions (see FIG. 7). The cleat further includes an abutment or edge portion 110 that has a first surface 112 that transitions into an upper surface 114, which then transitions into a second surface 116. In one example, the first surface 112 is at an obtuse angle relative to a main body surface 118 of the cleat, the upper surface 114 is generally parallel to the main body surface 118, and the second surface is at an obtuse angle relative to the main body surface 118.

First, the base plate 20 is unlocked from the track structure by pulling on the handle 90, which disengages the pins 94 from the holes 96. As the base plate 20 is moved outwardly of the cargo area to change a height of the base plate 20, the rear edge 50 of the base plate 20 engages the first surface 112 of the stop 100 as the base plate 20 is pivoted to change position. This causes the stop 100 to pivot to the deployed position to prevent the base plate 20 from disengaging from the vehicle. After the rear edge of the base plate 20 has been fully re-installed at the desired track level, the stop 100 returns to the stowed position and the base plate 20 is selectively locked to the track structure in the lock position that comprises the fully installed position.

The subject disclosure provides an adjustable base plate system that has an upper and lower tier track that allow the user to choose the height of the load floor for the base plate. In one example, the first and second tier tracks are configured such that choosing the upper tier track (FIG. 3E) allows ten sheets of drywall to be stored underneath the base plate without detaching or moving boxes/accessories that are supported by the base plate. Choosing the lower tier track allows boxes/accessories to be more contained within the cargo bed and potentially other items to be piled on top while still being below the level of the side of the bed.

In one example, the track structures comprise steel roll-formed side structures, which allow the tracks to be taller such that a third or fourth tier level could be implemented, which allows the base plate to form a tonneau cover over the bed. This prevents outsiders from seeing contents within the cargo area and provides security as the tailgate is locked up so the base plate cannot be removed. In one example, multiple base plates can be installed, such as one base plate serving as a tonneau cover and another base plate positioned on the lowest tier to provide support for accessories. By having the tracks on the sides of the cargo bed, the main truck bed area is kept clear for loading mulch, heavy objects, etc. Finally, the subject disclosure provides a cleat brake structure in a top of the tailgate, which serves as a stop mechanism to prevent a loaded base plate from sliding out of the vehicle when changing base plate levels, as well as providing a better low-friction slide for cargo versus tailgate molding alone.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An adjustable base plate system, comprising:
   a first track structure configured to extend along one side of a vehicle cargo area that comprises a pick-up truck bed enclosed at one end by a tailgate;
   a second track structure configured to extend along an opposite side of a vehicle cargo area;
   at least one base plate comprising an attachment system with a plurality of mounting apertures that interact one or more feet to support accessories within the vehicle cargo area, the at least one base plate having a first edge and a second edge opposite of the first edge, wherein the first edge is supported by the first track structure and the second edge is supported by the second track structure;

one or more of the accessories being attachable to the at least one base plate via insertion of the one or more feet through the plurality of mounting apertures, wherein each mounting aperture extends through thickness of the at least one base plate such that the one or more feet extend from a first side of the at least one base plate, through one of the mounting apertures, and past an opposite, second side of the at least one base plate; and wherein the first track structure and the second track structure each comprise at least a first tier track and a second tier track such that a distance between a bottom surface of the at least one base plate and a support surface of the vehicle cargo area can be adjusted.

2. The adjustable base plate system of claim 1, wherein the second tier tracks are spaced apart from respective first tier tracks in a vertical direction relative to the support surface of the vehicle cargo area.

3. The adjustable base plate system of claim 2, including at least an additional third tier track on each of the first track structure and the second track structure that is spaced apart from the first and second tier tracks in the vertical direction.

4. The adjustable base plate system of claim 3, wherein, when the at least one base plate is installed on the third tier track, a cover is provided to enclose the vehicle cargo area.

5. The adjustable base plate system of claim 2, wherein the second tier track is vertically higher than the first tier track such that when the at least one base plate is installed on the second tier track the vehicle cargo area is increased between the bottom surface of the at least one base plate and the support surface of the vehicle cargo area.

6. The adjustable base plate system of claim 2, wherein the support surface of the vehicle cargo area is free from any base plate support structures between the first track structure and the second track structure.

7. The adjustable base plate system of claim 1, including a first set of rollers on the first edge of the at least one base plate and a second set of rollers on the second edge of the at least one base plate.

8. The adjustable base plate system of claim 7, wherein the at least one base plate has a width extending in a lateral direction across a width of a vehicle and a length extending in a longitudinal direction along a length of the vehicle, and wherein rollers of the first and second sets of rollers are respectively spaced apart from each other in the longitudinal direction along the first and second edges of the at least one base plate.

9. The adjustable base plate system of claim 8, wherein rollers of the first and second sets of rollers extend outwardly of the first and second edges of the at least one base plate in the lateral direction.

10. The adjustable base plate system of claim 9, wherein the first and second edges of the at least one base plate have edge surfaces that are perpendicular to a cargo support surface of the at least one base plate.

11. The adjustable base plate system of claim 7, wherein the first and second sets of rollers are either positioned on the first tier track or the second tier track to install the at least one base plate in the vehicle cargo area.

12. The adjustable base plate system of claim 11, wherein the at least one base plate is moved at least partially outwardly of the vehicle cargo area via the first and second sets of rollers along one of the first and second tier tracks to install the at least one base plate on the other of the first and second tier tracks.

13. The adjustable base plate system of claim 1, including a locking mechanism to lock the at least one base plate to at least one of the first track structure and the second track structure in one of a plurality of lock positions.

14. The adjustable base plate system of claim 13, wherein the plurality of lock positions include at least a fully installed position where the at least one base plate does not extend beyond the vehicle cargo area and an extended position where the at least one base plate extends outwardly of the vehicle cargo area to provide an extended support surface.

15. The adjustable base plate system of claim 1, including a stop supported by a vehicle structure, wherein the stop prevents the at least one base plate from detaching from a vehicle while switching the at least one base plate between the first and second tier tracks.

16. An adjustable base plate system, comprising:
a first track structure configured to extend along one side of a vehicle cargo area;
a second track structure configured to extend along an opposite side of a vehicle cargo area;
at least one base plate having a first edge and a second edge opposite of the first edge, wherein the first edge is supported by the first track structure and the second edge is supported by the second track structure, and wherein the first track structure and the second track structure each comprise at least a first tier track and a second tier track such that a distance between a bottom surface of the at least one base plate and a support surface of the vehicle cargo area can be adjusted;
a stop supported by a vehicle structure, and wherein the stop prevents the at least one base plate from detaching from a vehicle while switching the at least one base plate between the first and second tier tracks, and wherein the vehicle cargo area comprises a pick-up truck bed, and wherein the vehicle structure that supports the stop comprises a tailgate.

17. A method comprising:
providing at least one base plate comprising an attachment system with a plurality of mounting apertures that interact one or more feet to support accessories within a vehicle cargo area;
adjusting a position of at least one base plate within the vehicle cargo area by moving opposing edges of the at least one base plate along a track structure that includes at least an upper tier track and a lower tier track;
forming the track structure to include at least a first mounting flange, a first plate associated with the first mounting flange and extending in a lateral direction to a second plate that extends in a vertical direction, and a second mounting flange associated with the second plate;
forming the upper tier track and the lower tier track in the second plate; and
selectively changing a distance between a bottom surface of the at least one base plate and a support surface of the vehicle cargo area by switching the at least one base plate between the upper and lower tier tracks.

18. The method of claim 17, including:
providing a first set of rollers along one of the opposing edges of the at least one base plate and a second set of rollers along the other of the opposing edges;

rolling the first and second sets of rollers along either the upper tier track or lower tier track to adjust a position of the at least one base plate within the vehicle cargo area; and selectively locking the at least one base plate to the track structure in one of a plurality of lock positions that include at least a fully installed position where the at least one base plate does not extend beyond the vehicle cargo area and an extended position where the at least one base plate extends outwardly of the vehicle cargo area to provide an extended support surface.

19. The method of claim 17, including:

moving the at least one base plate in a rearward direction along one of the upper tier track and lower tier track such that a rearward end of the at least one base plate extends outwardly of the vehicle cargo area;

pivoting the rearward end of the at least one base plate to move a forward end of the at least one base plate to the other of the upper tier track and lower tier track; and moving the forward end of the at least one base plate in a forward direction to install the at least one base plate on the other of the upper tier track and lower tier track.

20. The method of claim 19, including engaging a stop during pivoting to prevent the at least one base plate from disengaging from a vehicle that supports the at least one base plate.

21. A method comprising:

providing at least one base plate comprising an attachment system with a plurality of mounting apertures that interact one or more feet to support accessories within a vehicle cargo area;

adjusting a position of at least one base plate within the vehicle cargo area by moving opposing edges of the at least one base plate along a track structure that includes at least an upper tier track and a lower tier track; and selectively changing a distance between a bottom surface of the at least one base plate and a support surface of the vehicle cargo area by switching the at least one base plate between the upper and lower tier tracks, including moving the at least one base plate in a rearward direction along one of the upper tier track and lower tier track such that a rearward end of the at least one base plate extends outwardly of the vehicle cargo area, pivoting the rearward end of the at least one base plate to move a forward end of the at least one base plate to the other of the upper tier track and lower tier track, engaging a stop during pivoting to prevent the at least one base plate from disengaging from a vehicle that supports the at least one base plate, wherein the vehicle cargo area comprises a pick-up truck bed and including supporting the stop on a tailgate that encloses one end of the pick-up truck bed; and moving the forward end of the at least one base plate in a forward direction to install the at least one base plate on the other of the upper tier track and lower tier track.

22. The method of claim 17, including:

attaching the first mounting flange to a vertical side wall of the vehicle cargo area; and attaching the second mounting flange to a laterally extending bottom surface of the vehicle cargo area.

23. The method of claim 17, including forming the track structure from steel roll-formed side structures that include at least the upper tier track and the lower tier track.

24. An adjustable base plate system, comprising:

a first track structure configured to extend along one side of a vehicle cargo area;

a second track structure configured to extend along an opposite side of a vehicle cargo area;

at least one base plate comprising an attachment system with a plurality of mounting apertures that interact one or more feet to support accessories within the vehicle cargo area, the at least one base plate having a first edge and a second edge opposite of the first edge, wherein the first edge is supported by the first track structure and the second edge is supported by the second track structure;

wherein the first track structure and the second track structure each comprise at least a first tier track and a second tier track such that a distance between a bottom surface of the at least one base plate and a support surface of the vehicle cargo area can be adjusted; and wherein:

the first track structure and the second track structure each comprise at least a first mounting flange, a first plate associated with the first mounting flange and extending in a lateral direction to a second plate that extends in a vertical direction, and a second mounting flange associated with the second plate; and wherein the first tier track and the second tier track are formed in the second plate.

25. The adjustable base plate system of claim 24, wherein the first mounting flange is attached to a vertical side wall of the vehicle cargo area, and the second mounting flange is attached to a laterally extending bottom surface of the vehicle cargo area.

* * * * *